United States Patent
Ruelke et al.

(10) Patent No.: US 9,001,932 B2
(45) Date of Patent: Apr. 7, 2015

(54) METHOD AND APPARATUS FOR EXTRACTING THE QUADRATURE COMPONENT OF A COMPLEX SIGNAL FROM THE IN-PHASE COMPONENT AFTER BASEBAND DIGITIZING USING A COMPLEX TRANSFORM

(71) Applicant: Motorola Solutions, Inc., Schaumburg, IL (US)

(72) Inventors: Charles R. Ruelke, Margate, FL (US); Yadunandana M. Rao, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 69 days.

(21) Appl. No.: 13/730,924

(22) Filed: Dec. 29, 2012

(65) Prior Publication Data

US 2014/0185718 A1    Jul. 3, 2014

(51) Int. Cl.
*H03D 3/00* (2006.01)
*H03K 9/06* (2006.01)
*H04L 27/22* (2006.01)
*H04L 27/38* (2006.01)
*H04N 5/46* (2006.01)
*H04N 21/426* (2011.01)

(52) U.S. Cl.
CPC ............ *H04L 27/22* (2013.01); *H04L 27/3818* (2013.01); *H04N 5/46* (2013.01); *H04N 21/42638* (2013.01)

(58) Field of Classification Search
None
See application file for complete search history.

(56) References Cited

U.S. PATENT DOCUMENTS

| | | | |
|---|---|---|---|
| 4,902,979 A | 2/1990 | Puckette, IV | |
| 5,406,587 A | 4/1995 | Horwitz et al. | |
| 5,557,642 A * | 9/1996 | Williams | 375/316 |
| 5,841,814 A * | 11/1998 | Cupo | 375/321 |
| 5,982,820 A | 11/1999 | Limberg | |
| 6,480,236 B1 | 11/2002 | Limberg | |
| 7,394,871 B2 | 7/2008 | Zhang et al. | |
| 7,876,149 B2 | 1/2011 | Song et al. | |
| 8,055,207 B2 | 11/2011 | Behzad et al. | |
| 2003/0193618 A1 | 10/2003 | Patel et al. | |
| 2011/0007847 A1* | 1/2011 | O'Keeffe et al. | 375/319 |
| 2012/0076229 A1 | 3/2012 | Brobston et al. | |
| 2012/0129480 A1 | 5/2012 | Ruelke et al. | |
| 2013/0156134 A1 | 6/2013 | Galan et al. | |

OTHER PUBLICATIONS

Corresponding International Applicaiton No. PCT/US2013/071950—International Search Report dated Mar. 12, 2014.

* cited by examiner

*Primary Examiner* — Chieh M Fan
*Assistant Examiner* — Wednel Cadeau
(74) *Attorney, Agent, or Firm* — Barbara R. Doutre

(57) ABSTRACT

A method and apparatus for a receiver system in a receiver that includes at least two front end branches, each branch having its own intermediate frequency (IF) mixer to shift a received signal to an IF. When receiving multiple independent signals, the signals are digitized and the receiver performs a digital complex transform on each signal to obtain the corresponding quadrature component. When receiving a single signal the signal is routed to two mixers that are 90 degrees out of phase to obtain the quadrature signal components in the analog section of the receiver.

19 Claims, 6 Drawing Sheets

METHOD AND APPARATUS FOR EXTRACTING THE QUADRATURE COMPONENT OF A COMPLEX SIGNAL FROM THE IN-PHASE COMPONENT AFTER BASEBAND DIGITIZING USING A COMPLEX TRANSFORM

FIELD OF THE DISCLOSURE

The present disclosure relates generally to a receiver apparatus for receiving complex radio signals and more particularly to processing the received complex radio signals such that the quadrature component of the signal is produced from the in-phase component by applying a complex transform to the in-phase component after down-converting and digitizing the in-phase component, eliminating the need for complex IQ processing for some portion of the receive system.

BACKGROUND

In a conventional radio receiver, a complex signal pair can be generated that has an in-phase (I) component and a quadrature (Q) component. The I and Q signal components are generated by modulating the received signal with an in-phase Local Oscillator (LO) signal to generate the I component while simultaneously modulating the same received signal with a quadrature LO signal phase shifted by 90 degrees from the in-phase LO so as to generate the Q component signal. Accordingly, in a conventional receiver, the complex IQ signal pair is demodulated using two mixers; a first mixer produces the analog I signal component and a second mixer, operating at the same frequency as the first mixer and at a 90 degree phase shift, produces the analog Q signal component. The analog I and Q signal components are typically filtered, digitized, and processed to produce sampled received data. Thus, the conventional approach requires two mixers in the analog front end, one for each of the complex signal components (I and Q). Likewise, each signal component branch requires its own filtering and other processing components, and each signal component is separately digitized.

Newer radio architectures, such as Software Defined Radio (SDR) systems, are able to receive a variety of signal types over a broad range of frequencies. That is, they can receive multiple different signals simultaneously. To receive multiple complex signals conventionally requires duplication of a single complex signal receiver, each complex receiver comprising two mixers where one is phase shifted, two filters, etc. The duplication of components to receive multiple signals, of course, adds to the amount of space, power, and other resources required for implementation, in proportion to the number of received signal being simultaneously processed. Clearly it would be beneficial to reduce the number of components used in the receiver system while still facilitating the simultaneous reception of multiple varied signals. Such a reduction of components would be possible if one of the complex signal component paths could be eliminated.

Accordingly, there is a need for a method and apparatus for obtaining both the in-phase and quadrature signal components using a single front end path.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
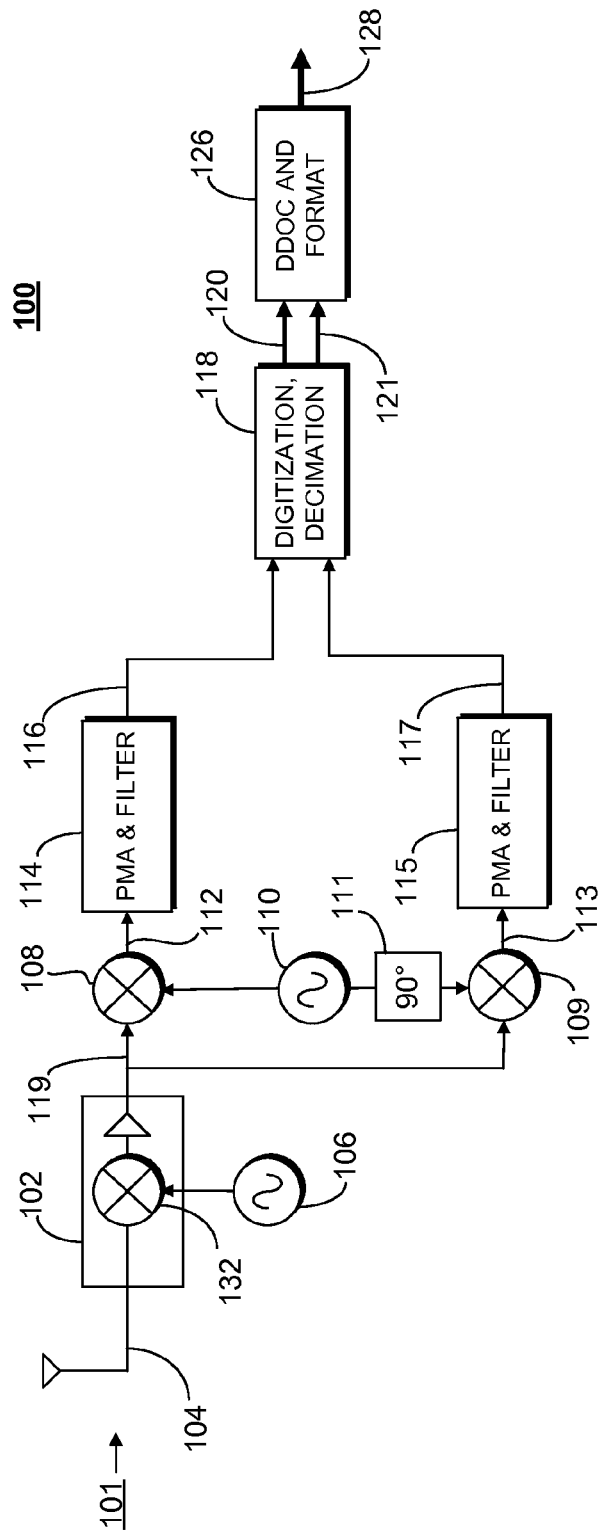
FIG. 1 is a block diagram of a receiver illustrating the prior art complex IQ receiver.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A receiver system includes a receiver processing block that generates an intermediate frequency signal from a received signal. The intermediate frequency signal being alternatively composed of either a pair of constituent in-phase (I) and quadrature-phase (Q) components, or a single band-pass IF (BP-IF) signal based on an receiver configuration control signal provided to the receiver processing block. The receiver system further includes a receiver down mixer in the receiver processing block that selectively operates as either an IQ or a BP-IF downmixer responsive to the receiver configuration control signal. The receiver system also includes an analog to digital converter that digitizes the IQ and BP-IF signals, and a digital complex transform block that selectively generates a constituent pair of in-phase (I) and quadrature-phase (Q) components from the digitized BP-IF signal when enabled by the receiver configuration control signal.

FIG. 1 is a block diagram of a receiver 100 illustrating a prior art complex IQ receiver. The legacy receiver system 100 is capable of receiving a signal where, upon receiving the signal, the received RF signal is separated into its constituent complex in-phase (I) and a quadrature (Q) signal component by the receiver 100. The receiver system 100 includes a RF receiver front end branch 101 that includes an analog front end 102, that processes a received RF signal via an antenna 104. The receiver front end 102 may include a RF Low Noise Amplified (LNA), intermediate frequency (IF) down mixer, and various filtering stages as may be necessitated to properly receive the desired on-channel RF signal. The analog front end 102 can be independently operated relative to other supporting circuits and can convert the received RF signal received via antenna 104 to an IF signal 119 by mixing the desired on-channel RF signal with an local oscillator signal (LO) signal from LO 106 at mixer block 132. The local oscillator 106 is programmable and can be set to an appropriate operating frequency so as to realize a desired IF output signal 119. The frequency of IF output signal 119 is selected based on various interference metrics, but is generally fixed to a specific operating frequency.

The IF output signal 119 is feed into a quadrature mixer pair including mixer 108 and mixer 109 for generating the in-phase I and quadrature-phase Q components of the received signal prior to complex IQ post-processing. The LO signal source for quadrature mixer pair 108, 109 is LO signal source 110 and a phase shifted LO signal at the output of phase shifter 111. The in-phase I component 112 from mixer 108 is derived by mixing the in-phase LO signal from local oscillator 110 with the received RF signal 119, while the quadrature-phase Q component 113 is derived from mixing the 90 degree phase-shifted LO signal from phase shifter 111 with the received RF signal 119 at mixer 109. The frequency difference between the local oscillator 110 and the received RF signal 119 may approach zero hertz such as implemented for a Direct Conversation receivers (DCR) system. This DCR configuration reduces the occupied Bandwidth (BW) of the constituent I and Q signals 112 and 113; however the modulated information signal embedded within the complex IQ signal pair is preserved as the Q signal is phase shifted by 90 degrees from the I signal thereby preserving the modulated information signal within the complex signal domain. The I component signal 112 is processed by post mixer amplifier (PMA) and filter block 114 to produce a post-processed I signal 116 having optimum signal fidelity for the desired on-channel received signal. The Q component signal 113 is processed by PMA and filter block 115 to produce a post-processed Q signal 117 having optimum signal fidelity for the desired on-channel received signal. Both IQ signals 116, 117 are sampled in tandem by a digitizing and decimation block 118 that samples the complex IQ signals 116 and 117 to produce a sampled received signals 120 and 121 that represent the in-phase I and quadrature phase Q on channel received signal respectively.

The digitization block 118 can sample baseband signals 116, 117 at a rate that satisfies the Nyquist criterion. Accordingly, if the IF bandwidth for PMA and filter blocks 114, 115 is, for example, from 0-1 MHz, the sampling rate can be 2 MHz or more. The sampling rate can be programmable and changed to match the actual frequency bandwidth of the IQ baseband signals 116, 117. The complex IQ sampled received data can be subsequently down-converted (decimated) to a different sample rate as may be optimum for further digital post processing. After digitization and decimation block 118, the decimated sampled received signals 120 and 121 may be further processed at DC offset correction (DCOC) and formatting block 126 where the digital IQ signal may be processed by the DCOC block 126 and formatted in a manner that is suitable for communication of the sampled received IQ data via an external interface signal 128. The external signal interface 128 can be connected to a Digital Signal Processor (DSP) for subsequent digital processing as may be necessitated for the receiver use application.

Figure 2:
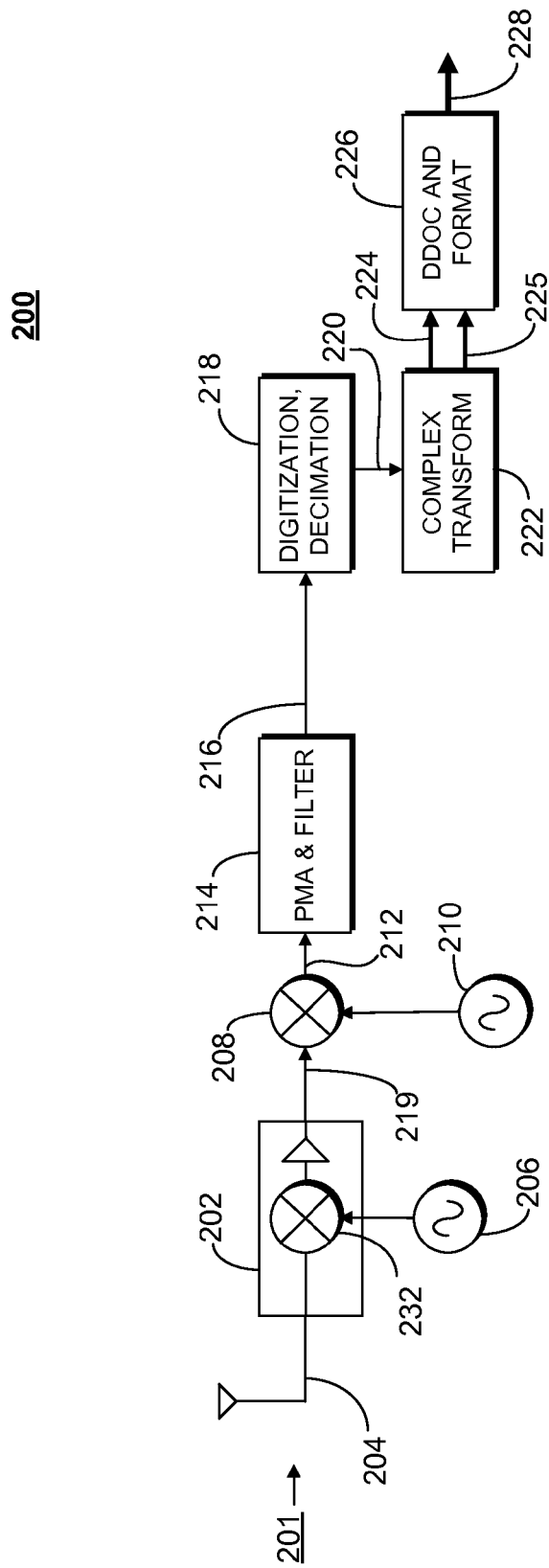
FIG. 2 is a block diagram for receiving a band-pass IF (BP-IF) signal in accordance with some embodiments.

FIG. 2 is a block diagram of a receiver system 200 for receiving a band-pass IF (BP-IF) signal in accordance with some embodiments. Generally, the receiver system 200 receives a RF signal, down-converts the received RF signal to an IF signal, digitized the IF signal, and generates a complex IQ signal pair representing the IF signal in the digital portion of the receiver system using a complex transform. The receiver system 200 may incorporate a RF receiver front end branch 201 that includes an analog front end 202, that processes an "on-channel" RF signal received via an antenna 204. The receiver front end 202 can include a RF Low Noise Amplified (LNA), down mixer, and various filtering stages as may be necessitated to properly receive the desired on channel RF signal. The analog front end 202, can be independently operated relative to other supporting circuits and may convert the received RF signal 204 to a first intermediate frequency (IF) signal 219 by mixing the desired on-channel RF signal with a LO signal from local oscillator 206 at mixer block 232. The local oscillator 206 is programmable and can be set to the appropriate operating frequency so as to realize the correct first IF output signal 219.

The IF signal 219 subsequently processed by a single, non-quadrature, mixer stage 208 to produce a Band Pass IF (BP-IF) signal 212. The LO signal source for mixer 208 is LO signal source 210, whereby the IF signal 219 is down converted to an analog Band Pass IF (BP-IF) signal 212 at the output of mixer 208. The frequency difference between the LO signal source 210 and the IF signal 219 must be greater than the occupied bandwidth (BW) of the IF signal 219 so as to ensure that none of the modulated information embedded into the desired on-channel received signal is distorted. For the purposes of this discussion, occupied BW is defined as the minimum frequency domain BW that encompasses all of the desired on-channel received signal when the on-channel signal is modulated (at the transmitter) with a valid information signal so as to produce the widest variance in the received signal spectral domain response. This receiver system can be described as a Very Low IF (VLIF) configuration that requires a higher occupied BW for PMA and filter block 214 to appropriately process the BP-IF signal 212 as compared to the complex IQ PMA and filtering blocks 114 and 115 of FIG. 1.

The BP-IF signal 212 is subsequently processed by PMA and filter block 214 to produce a post-processed BP-IF signal 216 having optimum signal fidelity for the desired on-channel received signal. The digitizing and decimation block 218 samples the filtered BP-IF signal 216 at a rate that satisfies the Nyquist minimum sample rate criterion to produce a sampled BP-IF signal 220 that digitally represents the filtered BP-IF signal 216, which is an analog signal. The sampled BP-IF signal 220 is subsequently processed by a complex transform block 222 so as to produce the constituent complex IQ signal pair representing the sampled BP-IF signal 220. The complex transform block 222 applies a complex transform to the BP-IF signal 220. The complex transform is a mathematical operation that extracts the complex counterpart signal. That is, for example, digital BP-IF signal 220 can be considered as the in-phase I signal component, and the complex transform 222 produces the associated 90 degree phase shifted quadrature Q signal component to produce an IQ pair 224, 225. The complex transform can be a Hilbert transform H $\{f(t)\}$. Accordingly, the complex transform block produces single IQ signal pairs 224, 225 corresponding to digital BP-IF signal 220. The complex transform block 222 can be a Hilbert filter that produces the analytic signal of real bandpass signal. By definition, an analytic signal is comprised of real and imaginary parts representing the in-phase (I) and quadrature phase (Q) constituents of the bandpass signal. In continuous time, the Hilbert filter is denoted by the impulse response $h(t)=1/\pi t$. For a practical implementation, a truncated approximation of the continuous time filter is adopted. The complex transform block 222 produces an idealized quadrature IQ signal pair representing the sampled BP-IF signal 220 (limited only by the digital precision of complex transform block 222) whereby the amplitude and phase imbalance errors introduced into the desired on-channel received signal by analog IQ signal paths (blocks 114 and 115 of FIG. 1) is eliminated. The IQ signal pairs 224, 225 are processed by DCOC and formatting stage 226 wherein the digital IQ signal may be processed by the DC Offset Correction (DCOC) system and formatted as may be suitable for communication of the sampled BP-IF signal's IQ data via an interface signal 228. The data from IQ signal pair 224 is formatted in, for example, synchronous serial interface (SSI) format at interface signal 228, for use by the radio system in which the receiver system 200 is implemented.

As shown in FIG. 2, the receiver system 200 does not produce analog quadrature signals at the output of mixer 208. Instead, the BP-IF signal 212 is spectrally offset from baseband DC by a frequency amount at least equal to the occupied BW of the desired, on-channel received signal. This is different from what is commonly done using two separate mixers to produce a complex IQ analog signal pair thereby requiring two tandem analog signal paths to process the I and Q signals simultaneously. By deriving the Q signal component in the digital section of the receiver at block 222, several analog signal processing components can be eliminated. The savings can be realized proportionally in receiver architectures designed to receive multiple RF channels simultaneously since a mixer and phase shift component can be eliminated at the IF stage (e.g., mixer 109 and phase shift stage 111 for FIG. 1) and in the second IF/baseband section (e.g., PMA and filter stages 115 of FIG. 1).

Figure 3:
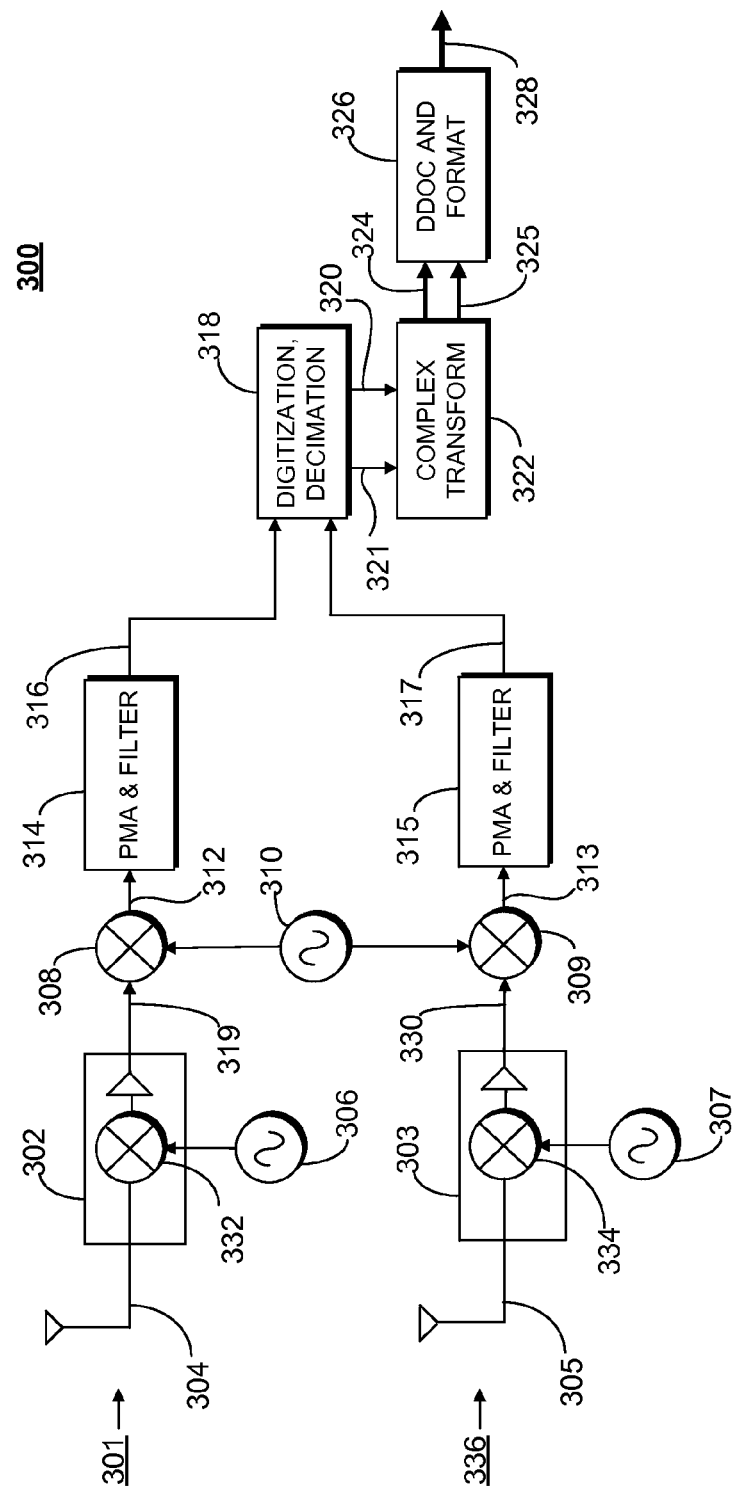
FIG. 3 is a block diagram of a receiver that can be configured for receiving two independent BP-IF signals simultaneously in accordance with some embodiments.

FIG. 3 is a block diagram of a receiver 300 that can be configured for receiving two independent BP-IF signals simultaneously in accordance with some embodiments. The present receiver system 300 is capable of concurrently receiving two independent and uncorrelated radio signals, where the radio signals are first processed by the appropriate analog front end bocks 302 and 303 before being down mixed to the appropriate BP-IF signals 312 and 313 at the output of mixer blocks 308 and 309 respectively. As will be appreciated by those skilled in the art, although two paths are taught here as an example, additional paths can be added to receive and process more than two signal concurrently. The receiver system 300 includes a first receiver front end branch 301 and a second front end receiver branch 336. Each front end receiver branch includes an analog front end 302, 303 that processes a signal received via an antenna 304, 305. Each analog front end 302, 303 includes conventional radio frequency (RF) analog signal processing components such as a preselector, a Low Noise amplifier (LNA), and filtering components. The analog front ends 302, 303 can, in some embodiments, may each be independently configured for dual conversion operation to produce an intermediate frequency (IF), using local oscillator (LO) sources 306, 307 to convert received signals from a received frequency to a selected first $1^{st}$ IF signal 319 via a mixer 332, and second $1^{st}$. IF signal 330 via a second mixer 334. The LO signal sources 306, 307 are programmable and can be independently set to a produce IF signals 319 and 330 having different $1^{st}$ IF frequencies. The $1^{st}$ IF signals 319 and 330 each correspond to a different received signal from front end branches 301 and 336 respectively. Generally, the plurality of $1^{st}$ IF signals 319, 330 are fixed, but receiver architectures can be implemented that facilitate reassignment of $1^{st}$ IF signals 319 and 330 to alternative frequencies as may be necessary to prevent external interference and degraded desired on channel signal fidelity.

The output of the analog front ends 302, 303 are subsequently downconverted to BP-IF signals 312 and 313 at baseband mixers 308 and 309, respectively. The first and second baseband mixers 308, 309 may be coupled to a common baseband local oscillator (BB LO) 310 that is programmable. The frequency of BB LO block 310 is selected such that the offset between BP-IF signals 312 and 313 is sufficient to ensure that no information within the modulation signal contained in the BP-IF signals 312, 313 is lost or distorted. Given that there is a single BB-LO signal source driving two mixers, it is apparent that for one mixer block (e.g., 308) the LO frequency may be lower (e.g., low side injection) than IF signal 319, whereupon the same LO frequency will be higher (e.g., high side injection) than the frequency of IF signal 330. It is also evident that the occupied BW for IF signals 319, 330 (e.g., $BW_{319}$ and $BW_{330}$) are equal to the occupied BW for BB-IF signals 312, 313 respectively. Accordingly, there is a relationship between the difference in IF frequencies 319 and 330 and the frequency for BB LO signal (e.g., $F_{BB\text{-}LO}$) from block 110 so as to ensure that occupied BW for each BB-IF is spectrally contained in the appropriate signal 312 and 313. Assuming that IF signal 319 is the highest IF single being utilized, then this relationship may be mathematically represented as $F_{BB\text{-}LO} \leq IF_{319} - MAX(BW_{319}, BW_{330})$, referred to as  Eq. #1; and $IF_{330} \leq F_{BB\text{-}LO} - MAX(BW_{319}, BW_{330})$, referred to as  Eq. #2

Both IF signals 312, 313 are therefore shifted by an appropriate amount, to maintain the necessary separation and ensure the associated modulation signal BW is not compromised. Although it is common for a mixer in a receiver to be configured to operate as a complex mixer generating tandem IQ components of the received RF signal, baseband mixers 308, 309 are simple, or single phase, mixers, and therefore only output a single phase component within BP-IF signals 312, 313.

Each BP-IF signal 312, 313 is subsequently processed by post mixer amplifier (PMA) and filter block 314, 315, respectively, to provide filtered analog BB-IF signals 316, 317 that are subsequently digitized by a digitization block 318. It should be noted that the BW and gain configurations for PMA and filter blocks 314, 315 can be set independently from each other such the filter BW corners and gains may be different between blocks 314, 315. The digitization block 318 can be a sigma-delta analog to digital converter with decimation (to change the sampling rate) and anti-aliasing filtering. The digitization block 318 samples BP-IF signals 316, 317 simultaneously at a rate that satisfies the Nyquist criterion for the signal having the highest occupied BW. Accordingly, if the occupied BW for BP-IF for signal 316 is, for example, 1 MHz, while the occupied BW for BP-IF signal 317 is 250 kHz, the sampling rate for block 318 must be 2 MHz or more. The sampling rate can be programmable and changed to match the actual frequency bandwidth of the filter analog BB-IF signals 316, 317. The digitization block 318, after sampling the filtered BP-IF signals 316, 317, can be further downconverted to a lower sampled signal representation in the frequency domain as may be needed to reduce current drain while still preserving the desired on-channel received signal fidelity. The digitization block 318 produces tandem digitized BP-IF signals 320, 321, respectively, corresponding to analog BP-IF signals 316, 317, that are conveyed to a complex transform block 322. The complex transform block 322 applies a complex transform to each signals 320, 321. The complex transform is a mathematical operation that generates a complex counterpart signal from an assumed in-phase reference signal (e.g., sampled BP-IF signals 320, 321). That is, for example, a single sampled BP-IF signal 320 can be considered as the in-phase signal component of a first received signal, and the complex transform generates the corresponding quadrature Q signal component to produce an IQ signal pair 324 derived from BP-IF 320. In addition, a single sampled BP-IF signal 321 can be considered as the in-phase signal component of a second received signal, and the complex transform generates the quadrature Q signal component to produce an IQ signal pair 325 derived from BP-IF 321. The complex transform can be a Hilbert transform H{f(t)} implemented as a truncated Hilbert filter. Accordingly, the complex transform block 322 produces first and second IQ signals pairs 324, 325 derived from sampled BP-IF signals 320, 321 respectively. The complex transform block 322 produces ideal quadrature IQ signal pairs 324, 325. The IQ signal pairs 324, 325 are fed to a DCOC and formatting stage 326 that performs any DC offset correction and formats the data represented by each IQ signal pair 324, 325 as may be needed for conveyance over an external digital interface. The data from each IQ signal pair 324, 325 is formatted in, for example, synchronous serial interface (SSI) format 328, for use by the radio system in which the receiver system 300 is implemented.

As shown in FIG. 3, the receiver system 300 does not produce analog quadrature signals at the output of mixers 308 and 309. Instead, the BP-IF signals 312 and 313 are independently processed simultaneously at processing blocks 314 and 315 so as to produce appropriate filtered BP-IF signal for digital conversion. This architecture reduces the number of processing blocks (and associated size and current penalties) necessary for processing two complex IQ signals using analog circuits, as typical for legacy receiver systems, by half. By deriving the Q signal component in the digital section of the receiver at block 322, significant analog complexity and cost saving are realized while enhancing the precision of the IQ signal fidelity given that Q is derived directly from the assumed reference in-phase I signals 320 and 321 as previously described. The savings can be scaled proportionally in receiver architectures designed to receive two or more RF channels simultaneously since a mixer and phase shift component required for each channel in a conventional analog IQ receiver can be eliminated at the mixer stage (e.g., mixer 109 and phase shift stage 111 for FIG. 1) and the analog Q channel processing block for each channel is eliminated (e.g., PMA and filter stages 115 of FIG. 1). It is also apparent to those skilled in the art that receiver architecture 300 can be easily configured for single channel operation, as previously described in FIG. 2, simply by disabling those blocks associated with the unused receive channel when operating in single channel receive mode.

Figure 4:
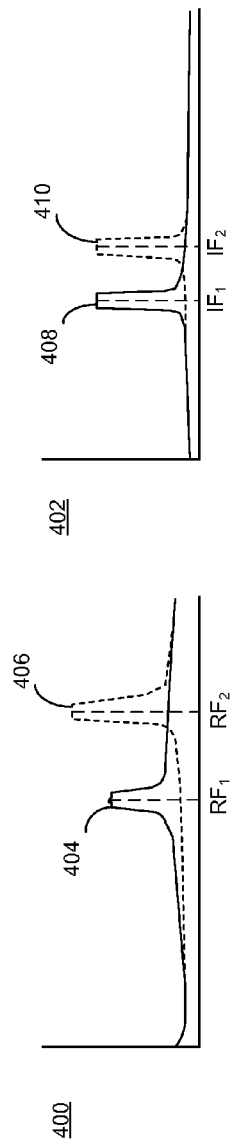
FIG. 4 is a chart of Power Spectral Density (PSD) of both the RF domain and intermediate Frequency (IF) domain of two simultaneous received signals being processed by a receiver in accordance with some embodiments.

FIG. 4 shows a pair of spectral charts, 400, 402, which illustrate the tandem receiver spectrum of RF signals 304 and 305 of FIG. 3 and their associated filtered BP-IF signals 316 and 317. The spectral charts 400, 402 show signal frequency in the horizontal axis, and magnitude in the vertical axis. When operating in dual receive configuration, receiver system 300 receives two radio frequency signals simultaneously. The radio signals are independent and not related to each other. Spectral response 400 shows the spectrum of the received RF signals 404 and 406 located at frequencies $RF_1$ and $RF_2$ that correspond to signals 304 and 305 of FIG. 3, respectively. As previously described for receiver system such as 300, the received RF signals are down-mixed to the appropriate IF frequencies, filtered and gain processed to produce filtered BP-IF signals 408 and 410 corresponding to 316 and 317 of FIG. 3, respectively. The filtered BP-IF signals 408, 410 are located at selected IF frequencies $IF_1$ and $IF_2$, respectively. The received RF frequencies can be in the range of hundreds of Megahertz to several Gigahertz in some embodiments. The BP-IF frequencies can be in the range of 10 kHz to several MHz in some embodiments. The frequency separation between IF signals 408, 410 can be different than that of received RF signals 404, 406 depending of the IF frequencies and the IF to BB-LO offset as previously described in Equations #1 and #2. In addition, the amplitude of BP-IF spectral responses 408 and 410 may be different than their associated RF spectral responses 404 and 406 respectively as the receiver branches may perform automatic gain control (AGC) as may be necessary for each received signal so as to optimize the received Signal to Noise Ratio (SNR). It is further contemplated that the IF frequencies reflected in spectral response 408 and 410 can be dynamically changed in the event that an desired on channel received signal corresponding to a particular IF frequency is determined to be affected by interference while, or before receiving an RF signal.

Figure 5:
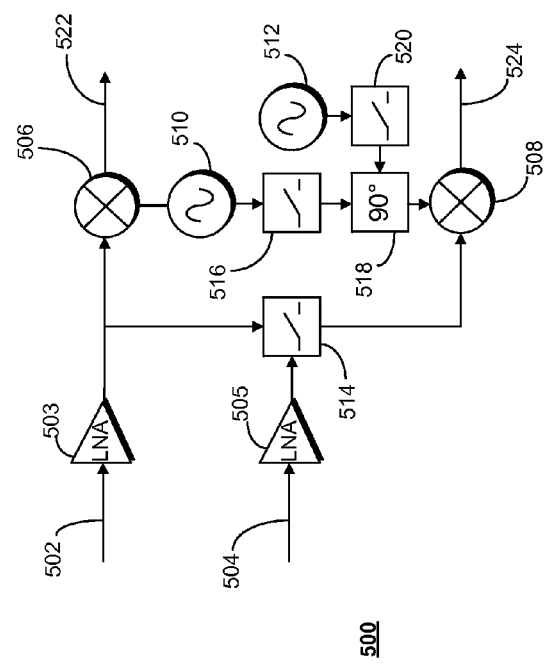
FIG. 5 is a block diagram of an LNA-mixer system illustrating an apparatus for selectively configuring a complex IQ mixer pair into a tandem BP-IF mixer configuration for a dual channel receiver in accordance with some embodiments.

FIG. 5 is a block diagram of an LNA-mixer system 500 that selectively configures a complex IQ mixer pair into a tandem BP-IF mixer configuration for a dual channel receiver in accordance with some embodiments. Generally, the LNA-mixer system 500 can be alternatively configured to receive a signal complex signal, or two BP-IF signals in tandem. When receiving only a single RF signal, the constituent IQ signal components are produced as analog IF signals which are then each digitized and processed. When receiving two independent RF signals, each is RF signal is processed into a corresponding BP-IF signal that is subsequently digitized, and the IQ signal components are produced by a complex transform in the digital processing section of the receiver. In the dual watch mode (i.e., receiving two signals simultaneously), the LNA-mixer system 500 can receive two independent signals 502 and 504 and process them independently as previously described for FIG. 3. Each received signal 502 and 504 is processed through a dedicated LNA 503, 505, respectively, and down-mixed at the appropriate mixer 506 and 508 to produce two independent BP-IF signals 522, 524. Note that received signals 502, 504 of FIG. 5 correspond to signals 319, 330 of FIG. 3 respectively, and BP-IF signals 522 and 524 of FIG. 5 correspond to 312, 313 of FIG. 3 respectively. As illustrated in FIG. 3, when LNA-mixer system 500 is configured for dual receive operation, only one mixer 506, 508 per branch is used. Accordingly, in the dual watch mode, the quadrature signal component of each signal is extracted by the complex transform in the digital section of the receiver, as shown in FIG. 3 (e.g. complex transform block 322). To configure LNA-mixer system 500 for simultaneous dual receive operation, the LNA-mixer-LO interconnection must be adjusted, in part, by use of switches, such as switches 514, 516, 520. The LNA-mixer system 500 includes a first IF mixer 506 and a second mixer 508, and a first LO source 510 and a second LO source 512. In the dual watch mode, switch 514 is configured to pass the output signal from LNA 505 to mixer 508, while the output signal of LNA 503 is conveyed to mixer 506. In tandem with configuring switch 514, switch 516 and switch 520 configured such that LO source 512 is disabled and disconnected from phase shifter 518 while LO source 510 is routed to both mixer 506 and mixer 508. Alternatively, switches 516 and 520 may be configured to disconnect LO source 510 from mixer 508 while LO source 512 is conveyed to mixer 508 directly or through the phase shifter block 518. This alternate configuration allows for two independent LO source to be used when receiving two desired on channel signal thereby increasing flexibility in the selection of the BP-IF frequency for signals 522 and 524. In dual receive mode, LNA-mixer-LO blocks 506, 508, 510 of system 500 may be configured in parallel to process signals 502 and 504 in like manner as signals 319 and 330 are processed by the LNA-mixer-LO configuration 308, 309, 310 of FIG. 3. Thus, in dual receive mode, the LNA-mixer system produces a first BP-IF signal 522 and a second BP-IF signal 524 in similar fashion as previously described for FIG. 3. However, the LNA-mixer system 500 can also be operated in a single channel receive mode where the analog output of the mixers produce an analog complex IQ constituent signal for a single RF signal.

In a single channel, complex IQ analog receive topology, there is no received signal 504, or at least it is ignored, and switch 514 is configured such that the output of LNA 503 is conveyed to both mixers 506 and 508. In addition, switches 516 and 520 are configured such that the LO signal source 512 is disconnected from phase shifter block 518, and LO 510 is conveyed to the first mixer 506 directly and also conveyed to mixer 508 through a 90 degree phase shifter 518. In single channel complex receive topology, mixer block 506 produces an in-phase I component 522 of the received signal 502 and second mixer block 508 produces the quadrature phase, Q component 524 of signal 502 given that the LO to mixer 508 is phase shifted by 90 degrees through block 518. Thus, in single channel receive mode, the I signal component and Q signal components 522 and 524 respectively represent the complex IQ constituent pair of received signal 502, and are spectrally located at the same IF frequency relative to the desired on channel received signal 502. In single watch mode, there is no need for the complex transform in the digital section of the receiver, so the complex transform block 322 of FIG. 3 may be disabled. In the single channel, complex receive mode, blocks 506, 508, 510 of system 500 may be configured in parallel to process signal 502 in like manner as signal 119 is processed by the LNA-mixer-LO configuration 108, 109, 110 of FIG. 1. The advantage of configuring the signal channel receiver for complex IQ analog operation is that the analog IQ signals can be moved to the lowest acceptable frequency of the baseband, allowing the sampling rate of the ADC to be reduced compared to a dual watch mode, thereby drawing less power.

Figure 6:
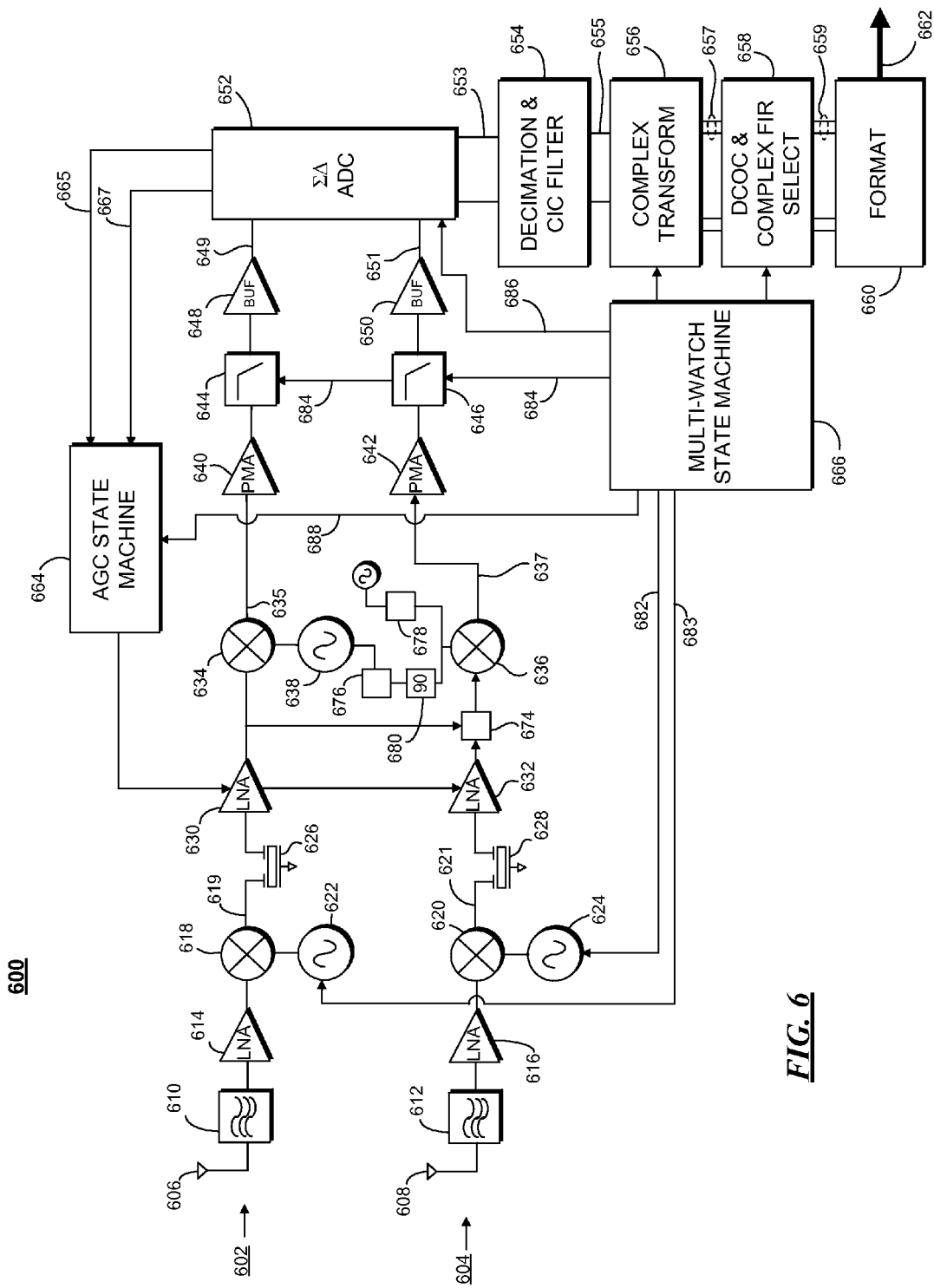
FIG. 6 is a block diagram of a receiver that can be adaptively configured for either a single carrier IQ receive operation of multiple BP-IF receive operation in accordance with some embodiments.

FIG. 6 shows a block diagram of a multi-watch receiver 600 in accordance with some embodiments. The multi-watch receiver 600 is a more detailed implementation of the receiver system 300 of FIG. 3. As used here, the term "multi-watch" refers to an ability to receive, or "watch," more than one radio channel simultaneously. More specifically, in multi-watch mode, multiple signals are received by the receiver, each signal being translated to a BP-IF signal using a single phase mixer, and where the individual BP-IF signals are processed by a complex transform to produce a quadrature or analytic Q component after the mixer stage. The multi-watch receiver 600 is also capable of receiving in a signal watch mode where a single received signal is processed using two mixers, one of the mixer's LO being phase shifted by 90 degrees so as to generate the IQ signal components in analog form from the original received signal. In single-watch mode the complex transform is accomplished at the quadrature mixer stages, and not derived from individual BP-IF signals through a post-mixer transformation. To provide multi-watch capability, the present exemplary receiver 600 incorporates multiple receiver processing blocks, such as a first receiver path 602 and a second receiver path 604. Both receiver paths in receive system 600 are shown configured in a dual conversion heterodyne receiver topology; however, those skilled in the art will appreciate that any combination of dual conversion receiver or direct conversion receiver (DCR) branch combinations are possible without departing from the scope of the present teachings. In addition, although two receiver paths 602, 604 are shown, it will be appreciated by those skilled in the art that there can be additional receiver paths substantially similar to receiver paths 602, 604 incorporated into receiver system 600 without departing from scope of the present teachings. Each receiver path 602, 604 has a receiver front end that includes an antenna 606, 608, via which electromagnetic radio frequency (RF) signals can be received over the air. Each receiver path 602, 604 further includes a preselector filter 610, 612, that filters out undesired RF interference signals that may be proximate to the desired on-channel received signal. Each path 602, 604 amplifies its respective received signal using LNAs 614, 616, which can be wideband amplifiers.

The output signal of each LNA 614, 616 is conveyed to a corresponding $1^{st}$ injection mixers 618, 620 respectively whereby the $1^{st}$ IF signals 619 and 621 are generated at the output of their respective mixers. First injection mixers 618, 620 are "simple" mixers in that each produces a single IF signal, not a complex IQ pair of outputs. Mixer 618 generates a first IF frequency signal 619 by mixing the output of LNA 614 with a first local oscillator (LO) source 622, and mixer 620 similarly generates a second IF frequency signal 621 by mixing the output of LNA 616 with a second LO source 624. LO sources 622, 624 can be programmable to operate at any of a wide range of IF frequencies, however the spectral content of each IF frequency for either 619 or 621 must be within the pass band of IF selectivity blocks 626 and 628 respectively to avoid undesired attenuation of the desired on-channel received signal. Furthermore, the frequencies of LO sources 622, 624 can be selected to produce IF signals 619, 621 at selected IF frequencies, based on, for example, determined signal and spectral conditions. Accordingly, each IF signal 619, 621 can be filtered by corresponding IF filters 626, 628 respectively, which can be, for example, crystal filters. IF filters 626, 628 provide selectivity in attenuating undesired signals outside of the desired on channel received signal while generally inducing minimum insertion loss. Each filtered IF signal is subsequently conveyed to a corresponding IF amplifier (IFA) 630, 632, which are gain compensated (e.g. automatic gain control—AGC) to optimize the SNR of the desired on-channel received signal. The outputs of the IFAs 630, 632 are subsequently processed by a configurable mixer system comprised of mixer pair 634, 636 and switches 674, 676, and 678. Mixer pair 634, 636 down-converts the filtered $1^{st}$ IF signals from IF filter blocks 626, 628, respectively, to produce a baseband spectral response. Note that mixer pair 634, 636 can correspond to mixer pair 506, 508 of FIG. 5. In addition, switch matrix 674, 676, and 678 can correspond to switch matrix 514, 516, and 520 of FIG. 5 respectively. As described in FIG. 5, the LNA-mixer-LO system can be configured whereby LO source 638 is routed to mixer 634 and to mixer 636 through a 90 degree phase shifter 680. However, an alternative LO-mixer configuration may also be realized when switch 676 is configured to disconnect LO source 638 from mixer 636 while a second LO source is conveyed to mixer 636 via switch 678 (directly or through the phase shifter block 680). This alternate configuration increases flexibility in the generation of the mixer output signals 635 and 637. The switch configuration for switches 674, 676, and 678 may be set directly by a radio controller (not shown) or by a controller such as multi-watch state machine 666.

The LNA-mixer-LO configuration for receiver system 600 can be configured to receive a single, or multiple simultaneous signals. When receiver system 600 is configured to receive multiple simultaneous signals, the output 635 of mixer 634 is a BP-IF signal derived from a first received signal, and the output 637 of mixer 636 is a BP-IF signal derived from a second received signal. The BP-IF signals 635, 637 are each respectively conveyed to a corresponding Post Mixer Amplifier (PMA) 640, 642, which amplifies the BP-IF 635, 637. The output of each of the PMA 640, 642 is subsequently filtered by a corresponding filter 644, 646, and conveyed to a corresponding analog buffer 648, 650 so as to produce analog buffered BP-IF signals 649, 651. The buffered BP-IF signals 649, 651 are analog buffered band pass signals which are conveyed Analog-to-Digital Converter (ADC) 652. It should be apparent to those skilled in the art that when simultaneously receiving two independent signals through receiver branches 602 and 604, the IF filter 626, IFA 630 and PMA-filter blocks 640, 644 are configured to optimize the particular occupied BW and SNR requirements of the first received signal (e.g., the signal received via antenna 606). This configuration can be different from settings for IF filter 628, IFA 632, and PMA-filter blocks 642-646, which are scaled for the particular occupied BW and SNR targets of the second received signal (e.g., the signal received via antenna 608). Accordingly, PMA and BW settings for baseband blocks 640, 644 can be set independently from blocks 642, 646 when simultaneously processing two independent received signals that have been down-converted to appropriate BP-IF signals. For the multi-channel simultaneous receive embodiment, the filter BW settings for blocks 644, 646 (as well as other baseband processing blocks not delineated herein) can be set independently by a radio controller (not shown) or by Multi-watch state machine 666 via signal 684 depending on the desired mode of operation.

In some embodiments, the LNA-mixer-LO sub-system within receiver system 600 can be configured to receive a single on-channel desired signal ("single watch" mode), wherein the output 635 of mixer 634 is an in-phase I component of the desired received signal, and the output 637 of mixer 636 is a quadrature-phase Q component the desired received signal. In this configuration, switch 674 is set to connect the output signal from LNA 630 to mixer 636 while simultaneously disconnecting LNA 632 from mixer 636. In addition, switch 676 is set to connect LO signal source 638 to mixer 636 through phase shifter 680 so as to provide a 90 degree phase shifted LO source. Switch 678 is configured to disconnect any second LO sources as may have been utilized when operating in multi-channel receive mode. In this single channel, complex analog configuration, the complex IQ signal pairs 635, 637 are conveyed to the appropriate PMAs 640, 642 respectively, which amplify the IQ signals 635, 637. The output of each of the PMAs 640, 642 is subsequently filtered by a corresponding filter 644, 646, and conveyed to a corresponding analog buffer 648, 650 so as to produce analog buffered IQ signals 649, 651. The buffered IQ signals 649, 651 are analog buffered complex signals which are conveyed Analog-to-Digital Converted 652 of receiver system 600. It will be apparent to those skilled in the art that when receiving a single, on-channel signal utilizing a complex IQ analog, receiver branch 604 (from antenna 608 to LNA 632) is disconnected from mixer 636. Branch 604 is disconnected from mixer 636 by switch 674 when operating in complex IQ single channel mode. Therefore, for a single channel receiver utilizing a complex IQ analog configuration, the settings for 1 signal path PMA-filter blocks 640, 644 and Q signal PMA-filter blocks 642, 646 are set to equal values in tandem as the IQ signals pair produce the same occupied BW and necessitate the same gain settings for optimized SNR performance of receiver system 600. For the single channel receive embodiment, the filter BW settings for blocks 644-646, and PMA gain settings for blocks 640, 642 may be set in tandem by a radio controller (not shown) or by Multi-watch state machine 666 via signal 684 depending on the desired mode of operation.

The analog to digital converter (ADC) 652 of receiver 600 samples the buffered analog baseband signals 649, 651 so as to convert the input signal to a sampled received signal representation of the original analog signal pair 649, 651. The ADC block may be a sigma-delta converter. As previously described, in some embodiments the analog baseband signals 649, 651 are single BP-IF signals each containing the down-converted signal from a different received signal. In other embodiments, the analog baseband signals 649, 651 is a complex I, Q signal pair respectively, that when taken together represent a single desired on-channel received signal. ADC 652 can be operated at sampling rates of at least twice the bandwidth of the baseband signals 649, 651 so as to satisfy the Nyquist criterion in preserving the information signal that is modulated onto the desired on channel received signal. Accordingly, the ADC 652 outputs sampled digitized signals 653 to a decimation and cascade integrator-comb (CIC) filter stage 654. The decimation and CIC filter stage 654 processes the digitized signals 653 by decimating the ADC 652 sample rate to a different sample rate with appropriate filtering to remove undesired digital distortion such as aliasing. The decimation and filter stage 654 may include various substages (not shown) that are used to process and format the digital signals for subsequent processing. The operating configuration for ADC block 652 may be set by a radio controller (not shown) or by Multi-watch state machine 666 via signal 686 depending on the desired mode of operation.

The output of the decimation and CIC filter stage 654 is the decimated digital signals 655 which may be processed by a complex transform block 656. The complex transform block is dynamically enabled based on the configuration of switches 674, 676, and 678 so that when signals 649, 651 are multi-channel BP-IF signals, the complex transform block 656 is enabled. If switches 674, 676, and 678 are configured for single channel receive so that signals 649, 651 is a complex I-Q signal pair representations of a single received signal, then complex transform block 656 is disabled and bypassed. When the complex transform block 656 is enabled it applies or otherwise performs a complex transform on the received filtered digital signals to obtain the quadrature component of each filtered digital input signal, producing an IQ signal pair 657 for each filtered digital signal 655. The complex transform block can apply a Hilbert transform to the filtered digital signals 655. When disabled, the complex transform block 656 may be bypassed such that the input signal 655 is passed through to 657 directly. Accordingly, if enabled, and assuming the ADC 652 outputs separate signal streams for each input signal, the complex transform block processes two input signal 655 as shown in FIG. 6 to produce four (4) output signals 657, the four signals being a complex IQ signal pair for each input 655. When complex transform block 656 is disabled, the two input signals 655 are assumed to represent a single complex IQ pair; therefore, when disabled, transformed block 656 produces two (2) output signals 657 representing a single IQ signal pair corresponding to the single IQ input signal 655. The mode of operation for complex transform block 656, for example whether to support either multi-channel or single channel operation, may be set directly by a radio controller (not shown) or by another controller such as multi-watch state machine 666.

The output signals 657 from complex transform block 656 are subsequently processed by DC offset correction (DCOC)

and selectivity block 658. The DCOC-selectivity block 658 provides for DC offset correction processing of the signal 657 input to block 658 whereby any DC offset errors that may be embedded into the sample data is removed. In addition, DCOC-selectivity block 658 may incorporate multiple complex Finite Impulse Response (FIR) filters that provide selectivity to the desired on channel received signal(s). When configured to process multiple IQ signal pairs within signal 657, multiple complex FIR filter are enabled, each FIR filter being centered about a specific IQ signal pair corresponding to desired on-channel signal. When configured for signal channel receive operation, the DCOC-Selectivity block 658 enables a single FIR filter which is centered about a single IQ signal pair conveyed within signal 657. As is known in the art, FIR filter response is defined by the FIR filter order and coefficient values, each being adjustable to produce a desired selectivity response as may be necessary for proper receiver operation. Accordingly, DCOC-selectivity block 658 may incorporate memory registers (not shown) containing a tabularized coefficient archive defining possible channel selectivity responses that may be enabled as require based on the particular configuration of the receiver system 600. Alternatively, the FIR filter coefficients may be programmed into DCOC-selectivity block 658 directly from a controller, such as a digital signal processor. In this manner, DCOC-selectivity block 658 translates the sampled output signal 657 into a channelized sampled IQ signal pairs ostensibly containing only the desired information signals from baseband signals 649, 651. The processing mode of DCOC-selectivity block 658 to support either multi-channel or single channel operation may be set directly by a radio controller (not shown) or by another controller such as multi-watch state machine 666.

After being processed by the FIR selectivity sub-system within the DCOC-selectivity block 658, the channelized sampled IQ output from the FIR filters may be further processed by a secondary DC compensation using secondary DCOC strategies to minimize remaining residual DC offset errors in a particular sub-channel's spectral range. Not all FIR filter output signals may employ DCOC compensation; therefore, the method of DCOC compensation may vary depending on the specifics of the channel being filtered by a given FIR filter, specifically, the modulation type of the received signal and the accuracy of the DCOC compensation desired. Accordingly, the DCOC strategy in DCOC-selectivity block 658 may include a plurality of DCOC techniques as appropriate for a particular received signal.

The output of DCOC-selectivity block 658 is a channelized, complex paired IQ, sampled signal 659 that may represent either the on-channel received signals from multiple RF channels, or a single on-channel desired signal, depending on the particular configuration of receive system 600. The DCOC-selectivity block output signal 659 can be subsequently parallel processed by a plurality of blocks, including SSI formatting block 660. SSI formatting block 660 formats the complex IQ sampled signals to produce formatted signals 662, which are further processed by, for example, a digital signal processor (DSP). The SSI formatting parameters include, but may not be limited to: SSI clock rate, number of bits per sample, and number of data fields embedded in the SSI word. These SSI parameters may vary to ensure relevant information is preserved while supporting a diverse range of protocols. A plurality of SSI data fields may be processed by SSI formatting blocks 660, including but not limited to: the complex IQ sampled signals, AGC status for LNA 630, 632, and status of the DCOC compensation value from the DCOC-selectivity block 658. The SSI formatting block 660 can be dynamically configured, as well.

As show in FIG. 6, the ADC 652 is a multi-input, multi-output ADC. In some embodiments the ADC 652 may output a single, composite signal stream to the decimation & CIC filter block 654 that includes signal information for both the first and second received signals. The ADC 652 can be a single input, single output ADC where the signals 649, 651 are summed at a summing junction prior to arriving at the ADC 652. The decimation & CIC filter block 654 will process the composite signal, and present a single composite signal 655 to the complex transform block 656. The complex transform block will then process the composite signal, producing a complex IQ pair that is a summed multi-watch, composite, signal 657. Complex DCOC & complex FIR filter block 658 then separates the IQ signal pairs for each of the received signals from the signal complex IQ signal 657 through demixing and FIR filtering to produce the individual IQ signal pairs 659.

An automatic gain control (AGC) state machine 664 receives a carrier strength indication (CSI) signal, such as signal 665 and 667, from the ADC 652 indicating the strength of the received signals 649, 651 respectively. In response, the AGC state machine 664 adjusts the LNAs 630, 632 to maintain the desired on-channel receive signal at a desired level so as to optimize the SNR of a particular on-channel signal. The LNAs 630, 632 can be adjusted in tandem or can be adjusted independently depending of the configuration of receiver system 600. When system 600 is configured to process multiple received signal simultaneously, CSI signal 665, 667 may include a plurality of indication signals, one indication signal for each buffered analog baseband signal 649, 651 that are being sampled at ADC block 652. The plurality of CSI signals 665, 667 are processed independently by AGC state machine 664 and are used to determine the appropriate gain setting for a particular LNA positioned in series with the corresponding buffered analog baseband signal 649, 651. For example, CSI signal 665 indicates the signal strength of buffered signal 649 and is used to control LNA 630, while CSI signal 667 indicates the signal strength of buffered signal 651 which is used to control LNA 632. Accordingly, for this embodiment, AGC state machine 664 includes a least one processing algorithm for each received signal being parallel processed. It is apparent to those skilled in the art that a plurality of channel-specific AGC state machines can be implemented in place of a single AGC controller 664 as shown in FIG. 6, which thereby accomplishes the same functionality as described herein without departing from the novelty of the present teachings. Alternatively when system 600 is configured to process a single channel received signal as represented by its constituent IQ signal pairs 649 and 651, CSI signal 665, 667 represents the composite energy within the complex IQ signal pair 649, 651 respectively. For single channel operation, CSI signal 665, 667 are processed in combination (e.g., $I^2+Q^2$ energy detector) by AGC state machine 664 to determine the appropriate gain setting for both LNAs 632, 632 so as the attenuate the complex IQ signal pair 649, 651 in tandem. The configuration of the AGC state machine is can be set directly by a radio controller (not shown) or by Multi-watch state machine 666 via signal 688.

A multi-watch state machine 666 controls the receiver operating configuration and topology of receiver 600 through a plurality of receiver confirmation controls signals. For the purposes of this teaching, a receiver configuration control signal may be any one of a plurality of signals that is used to adjust the function of any receive sub-system, or receive topology, to enable single watch receive operation or multi-watch receive operation, and facilitate transitioning between said operating states. For example, a receiver configuration control signal may include, but is not limited to, LO configuration signals 682, 683, AGC configuration signal 688, PMA-Filter configuration signal 684, ADC operational control 686, complex transform, FIR selectivity, and DCOC control signals from multi-watch state machine 666, and the LNA-mixer-LO sub-system control signal for switches 674, 676, and 678. Accordingly, among other things, the selection of FIR filter response and DCOC strategy for DCOC-selectivity block 658 as well as the operating state of complex transform block 656 is set by multi-watch state machine 666.

The multi-watch state machine 666 is a controller or control element that sets the configuration of the receiver 600 to operate in a single or multi-watch mode through a receiver configuration control signal. As previously described for the complex transform block 656 and DCOC block 658, each sub-system block may be configured for either multi-channel simultaneous receive operation or for single channel (e.g., single watch) operation. Each mode necessitates a different configuration for complex transform block 656 and DCOC selectivity block 658 for optimum receiver function. The multi-watch state machine 666 can also control the switch configuration for switches 674, 676, and 678 in conjunction with the AGC state machine 664. When operating in multi-channel simultaneous receive mode, the switch matrix 674, 676, and 678 is configured (e.g., by the multi-watch state machine 666) to enable multiple receive branches to receive simultaneously and be down-mixed to the appropriate baseband path at mixers 634, 636. When in multi-channel receive mode, the AGC state machine 664 must process multiple channels independently as necessitated by the appropriate configuration for the switch matrix 674, 676, and 678; however, when receiver system 600 is operating in single channel receive mode, an appropriate mode change is necessitated for both AGC state machine 664 and switch matrix 674, 676, and 678. In addition, multi-watch state machine 666 may be used to control the configuration of PMA gain settings for blocks 640, 642 as well as filter block BW settings for 644, 646. As previously described for multi-channel or single channel operation, the PMA gain and baseband filter BW settings may be changed to support either complex IQ paired signals or individual uncorrelated BP-IF signals for mixer output signals 635, 637 depending on the mode of operation for receiver system 600. Finally, multi-watch state machine 666 can control LO sources 638, phase shifter 680 via a control signal, and may also be used to control other LO sources as may be needed such as $1^{st}$ injection LO sources 622, 624 using LO configuration control signals 682, 683. By controlling the particular LO configuration, multi-watch state machine 666 enables the appropriate configuration for multi-channel simultaneous receive, or for single channel operation, thereby disabling the appropriate LO source so as to reduce current drain and mitigate internal interference mechanisms. The multi-watch state machine 666 can be preloaded with the appropriate configuration data from a radio host processor (not shown) as necessary to enable the simultaneous reception of a plurality of desired received, each configuration being tailored to the protocol of the channel being received, baud rate of any modulated information, and other metrics that may affect the configuration of receiver 600 such as RF band selection and Forward Error Correction (FEC). Parameters that can be dynamically controlled by multi-watch state machine 666 include, but are not limited to, FIR coefficients and filter configurations (via Receiver configuration signal 684), DCOC strategies, complex transform methodologies, AGC response characteristics (via receiver configuration signal 688), ADC sampling rate, and LNA-mixer-LO switch configurations as may be needed for either single channel receive or multi-channel simultaneous receive operations.

Figure 7:
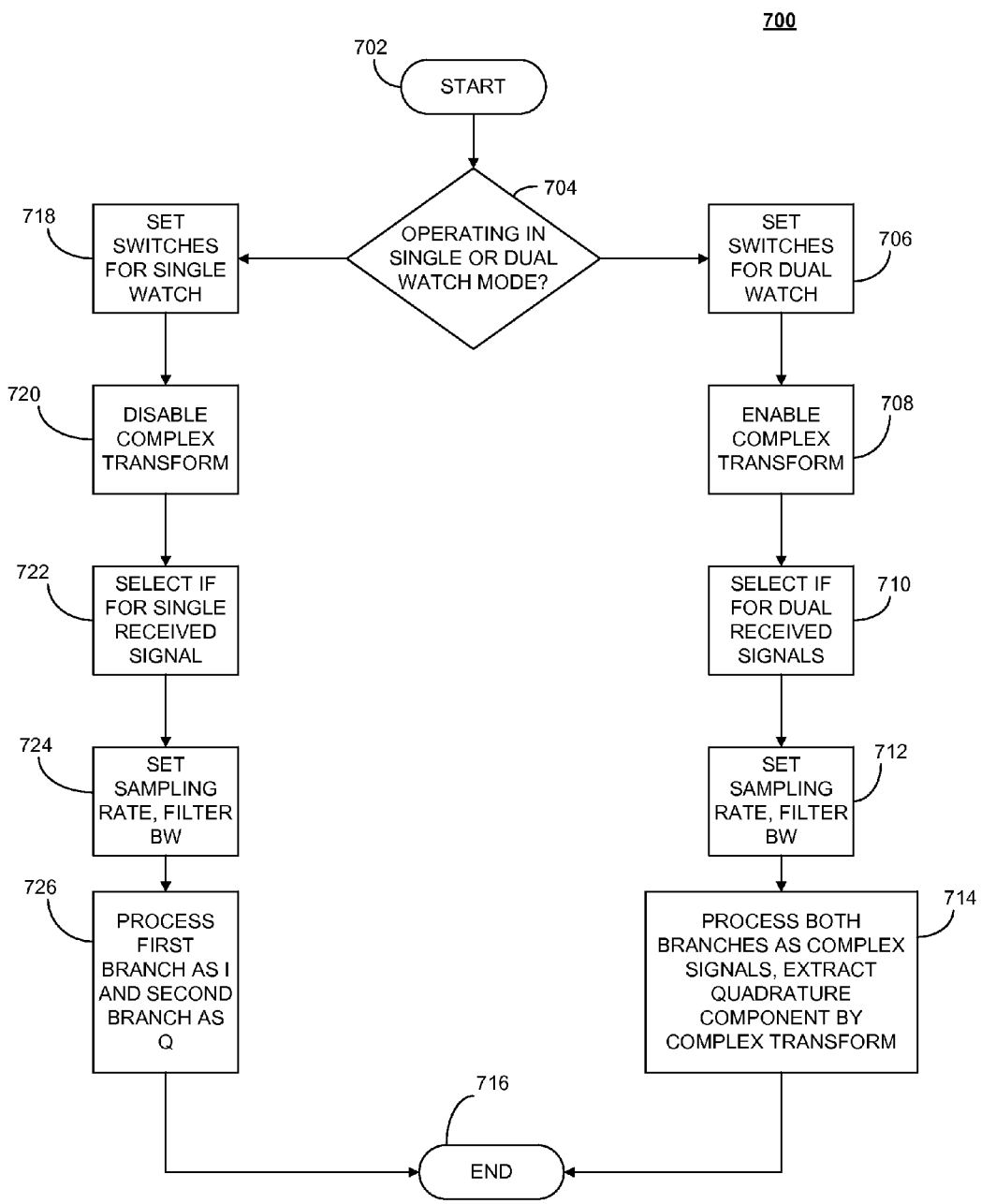
FIG. 7 is a flow chart illustrating the control process for a multi-watch state machine in controlling a receiver configuration in accordance with some embodiments.

FIG. 7 shows a flow chart diagram of a method 700 of operating a receiver system, in accordance with some embodiments. Specifically, the receiver system can simultaneously process more than one received signal. It is to be noted that, when receiving and processing more than one received signal, each received signal is from a different transmitter source, or the same transmitter source received through a different receive antenna, as in a multi-antenna receiver system. Each received signal is mixed down from its carrier frequency to an intermediate frequency as determined by the multi-watch receiver state machine. In some embodiments, the composite received signal with each received down-mixed signal placed at a uniquely determined IF is passed through a complex transform block. The output of the complex transform block represents the quadrature component of the composite IF signal. Note that while the receiver can be simultaneously receiving more than one RF signal, in receivers using a single output ADC, the output of the complex transform block along with its composite IF signal input together constitute a single complex SSI data stream wherein the multiple channel signals are embedded within the same complex signal at different intermediate frequencies within the complex frequency domain. Such a system includes a single broadband ADC with a multi-channel AGC state machine to optimally adjust the signal levels of the multiple input signals so as to prevent ADC saturation due to near-far signal scenarios. In another embodiment that allows multiple ADCs, or a multiple output ADC, each individually down-mixed IF signal is processed through the complex transform block to generate the quadrature signal equivalent. The SSI formatting block will then comprise of an array of SSI signals corresponding to the IQ signals from each receiver path. The chart in FIG. 7 shows various boxes, each of which is an abstraction of certain processes and sub-processes that are performed in carrying out the method 700. The method 700 in particular shows the operation of receiver system operable in either a single or a dual watch mode. The method can be carried out by, for example, a receiver system such as that shown in FIG. 6, in some embodiments. At the start 702, the receiver system is first powered on and ready for operation. There must first be a determination as to whether the receiver is to be operated in the single or dual watch mode, as indicated by process 704. The selection can be made by a user of the device using the receiver system, either directly, such as by an interface selection, or indirectly, such as by only selecting one channel to receive. When the dual watch mode is selected, the receiver system sets the switches for dual watch mode, as in process 706. Each receiver path is connected to a dedicated IF and IF-BP mixer (sequentially). Each receiver branch operates at its own receiver frequency, and the received signals are converted to IF signals using different IF mixers operated at different IF offset frequencies. Accordingly, the complex transform block of the receiver's digital section will need to be enabled, as in process 708. The receiver system must also determine the IF frequencies to be used and determine appropriate IF offset frequencies as in process 710. In process 712, the receiver system sets the sampling rate of the ADC, and the various filter coefficients for the appropriate bandwidths and other filter parameters. The IF frequencies can be selected to optimize signal fidelity, such as by avoiding spectral regions with interference, and optimizing signal to noise ratios. Furthermore, as indicated in process 714, the digital section of the receiver system processes the signals received over both branches on different IF sub-channels, and each is processed as a complex signal in a single complex SSI data stream wherein the multiple channel signals are embedded within the same complex signal at different intermediate frequencies. The corresponding quadrature signal components are obtained by applying a complex transform, such as, for example, a Hilbert transform, to the respective single sampled received IF input signals to produce the Q signal component for the IQ signal pairs for each input signal, which are further processed by the receiver system to obtain the on channel modulated information contained in the IQ signals. Once the receiver is so operating in multiple channel, simultaneous receive mode, the method terminates at 716 (until a change is made).

If the receiver system is operated in the signal channel receive mode, as determined in process 704, then the receiver system sets the switches, as in process 718, in the IF section (or the baseband section) to a configuration where the I and Q signal components are produced by the mixers. The switches may be configured by process 718 in accordance with that shown in FIG. 6, for example, in some embodiments. Since the I and Q signal components are produced in the analog section, via the mixers, the complex transform is not needed, and can is disabled, as indicated in process 720. In process 722 a single IF frequency is selected for operation by selecting an appropriate IF offset frequency for the IF local oscillator relative to the frequency of the received signal. In process 724, the sampling rate of the ADC is adjusted so that the Nyquist criteria is not substantially exceeded so as to minimize power consumption. The first and second receiver branches then provide the I and Q signal components to the digital section, and they are processed accordingly, as indicated by process 726. The method then terminates at 716.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A receiver system capable of operating as a single watch receiver or a multi watch receiver, the receiver comprising:
a controller that generates a receiver configuration control signal to configure the receiver to operate in a single watch mode or a multi watch mode;
a receiver processing block to process one or more received signals based on the receiver configuration control signal, the receiver processing block comprising at least one intermediate frequency (IF) amplifier to optimize SNR of at least one received signal, a first mixer, a second mixer, a local oscillator connected to the first mixer, a first switch that selectively connects the output of the IF amplifier to the second mixer, and a second switch that selectively connects the second mixer to the local oscillator through a 90 degree phase shift, wherein in the single watch mode the first switch is configured to connect the IF amplifier to the second mixer and the second switch is configured to connect the second mixer to the local oscillator through the 90 degree phase shift to generate in-phase and quadrature-phase (IQ) constituent pair of the at least one received signal, further wherein in the multi-watch mode, the first switch is configured to disconnect the IF amplifier to the second mixer to generate at least one band pass intermediate frequency (BP-IF) signal from the at least one received signal;

an analog to digital converter that digitizes the IQ constituent pair and the BP-IF signals generated by the receiver processing block to generate digitized IQ signal pair or digitized BP-IF signals; and a digital complex transform block which is enabled in the multi-watch mode and disabled in the single-watch mode and generates a constituent pair of in-phase (I) and quadrature-phase (Q) components from the digitized BP-IF signal.

2. The receiver system of claim 1, wherein the digital complex transform block when enabled, applies a Hilbert transform to the digitized BP IF signals to produce the digital I and Q signal components of each of the BP IF signals.

3. The receiver system of claim 1, further comprising:
at least one amplifier stage, having a gain, in the receiver processing block between an IF mixer and a baseband mixer; and
an automatic gain control (AGC) state machine that controls gain of the at least one amplifier stage based on at least one of an output from the analog to digital converter block or the receiver configuration control signal from the controller.

4. The receiver system of claim 1, wherein the controller is a multi-watch state machine that disables the digital complex transform block when the receiver system is operated in the single channel receive mode.

5. The receiver system of claim 1, wherein the analog to digital converter has a sampling frequency and changes the sampling frequency responsive to the receiver configuration control signal from the multi-watch state machine.

6. The receiver system of claim 1, further comprising a multi-channel selectivity and DC offset correction block that provides selectivity responses and provides DC offset correction, the selectivity responses dynamically adjusted by changing coefficients of filters in the multi-channel selectivity and DC offset correction block responsive to the receiver configuration control signal from the controller.

7. The receiver system of claim 1, further comprising a local oscillator offset controller that independently adjusts the local oscillator to a desired frequency.

8. The receiver system of claim 1, wherein the receiver system is configured to receive a first radio signal via a first receiver front end branch of the receiver processing block and a second radio signal via a second receiver front end branch of the receiver processing block, and wherein the first and second radio signals are independent and uncorrelated.

9. The receiver system of claim 4, wherein the multi watch state machine independently adjusts filter parameters of a first low pass filter between the first mixer and the analog to digital converter and a second low pass filter between the second mixer and the analog to digital converter.

10. A method of operating a receiver system including a receiver processing block having an intermediate frequency (IF) amplifier, first and second mixers, and a local oscillator connected to the first mixer, comprising:
determining whether a received signal is to be processed to generate an in-phase/quadrature-phase (IQ) signal or a bandpass IF (BP-IF) signal by the receiver system;
configuring a first switch to connect the IF amplifier to the second mixer when the receiver system is to process the received signal to generate the IQ signal, and to disconnect the IF amplifier from the second mixer when the received signal is to be processed to generate a BP-IF signal;
configuring a second switch to connect the second mixer to the oscillator through a 90 degree phase shift when the receiver system is to process the received signal to generate the IQ signal;
digitizing the IQ or BP-IF signal to produce either a digitized IQ signal pair or a digitized BP-IF signal; and
applying a digital complex transform to the digitized BP-IF signal when the received signal is to be processed to generate the BP-IF signal, wherein the complex transform produces a digitized IQ signal pair from the digitized BP-IF signal.

11. The method of claim 10, wherein the IF amplifier is a first IF amplifier of a first receiver branch, the receiver system further comprises a second IF amplifier of a second receiver branch, the method further comprises connecting the second IF amplifier to the second mixer when the received signal is to be processed as a BP-IF signal.

12. The method of claim 10, wherein applying the digital complex transform comprises applying a digital Hilbert transform to the digitized BP-IF signal.

13. The method of claim 10, wherein the first and second switches and the digital complex transform are selectively enabled by a multi-watch state machine.

14. A method for operating a receiver system, comprising:
determining a mode in which to operate the receiver system, where the mode is either a dual watch mode or a single watch mode;
configuring a set of switches, responsive to determining the mode, to route signals in the receiver system, wherein in the dual watch mode the switches are configured to route signals through each of at least two analog front end branches to a digital section, and wherein in the single watch mode the switches are configured to route a signal received at a first analog front end branch through mixers of both the first analog front end branch and a second analog front end branch and connect a common local oscillator to a mixer in the first analog front end branch and through 90 degree phase shifter to a mixer in the second analog front end branch to produce analog in-phase and quadrature signals; and
selectively enabling a complex transform block in the digital section, wherein the complex transform is enabled in the dual watch mode to produce a corresponding quadrature signal component for each signal received, and wherein the complex transform is disabled in the single watch mode.

15. The method of claim 14, further comprising:
adjusting a sampling rate of an analog to digital converter that digitizes the signals responsive to determining the mode.

16. The method of claim 14, further comprising determining an intermediate frequency for each received signal.

17. The method of claim 14, wherein enabling the complex transform block comprises performing a Hilbert transform on each of the received signals.

18. The method of claim 14, wherein determining the mode is performed responsive to a user input.

19. The method of claim 14, further comprising, responsive to determining the mode, adjusting filter parameters in filters used to process each received signal.

* * * * *